M. WALTER.
DRIVE FOR SELF PROPELLED VEHICLES.
APPLICATION FILED JULY 1, 1919.
1,377,864.
Patented May 10, 1921.
2 SHEETS—SHEET 2.
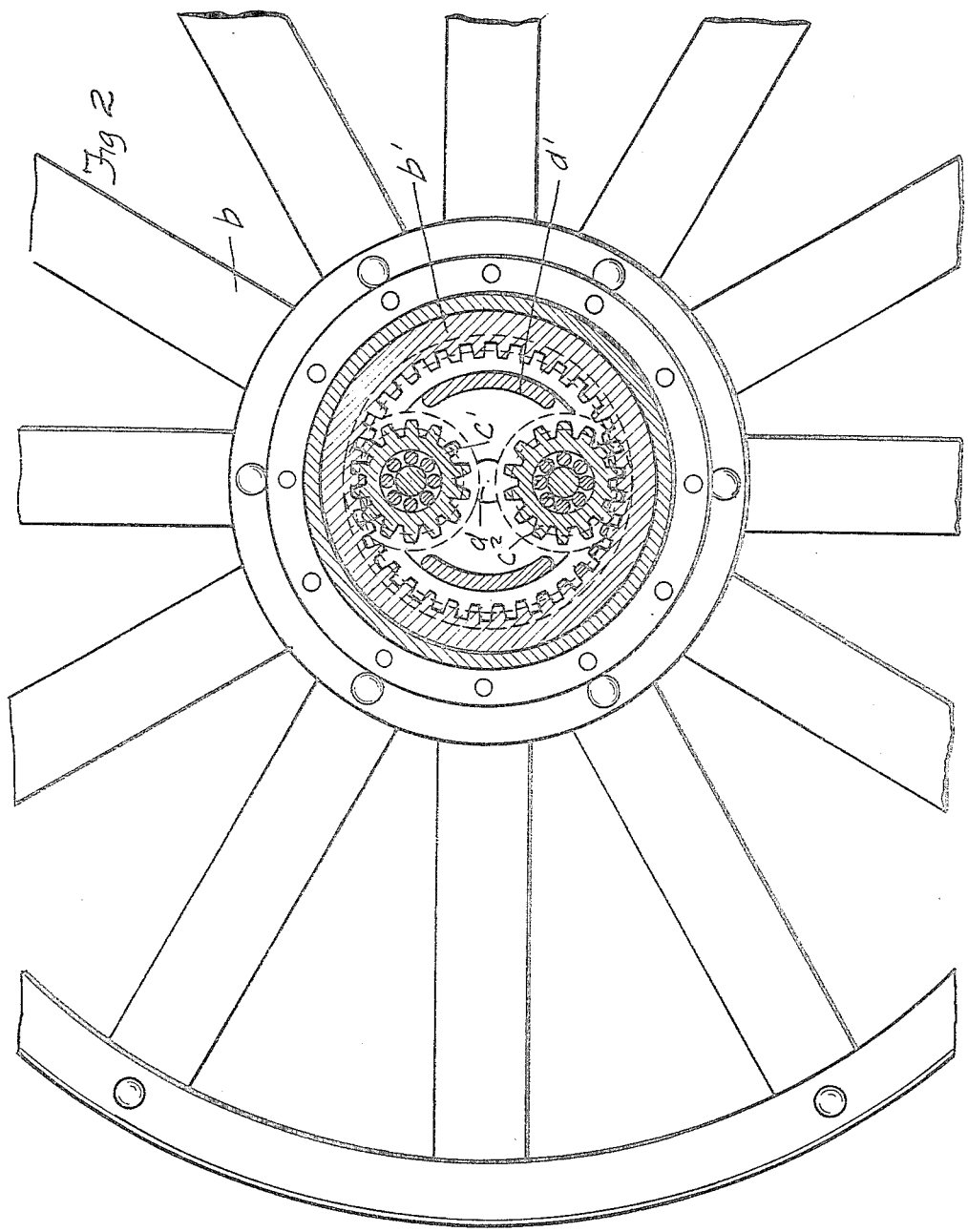

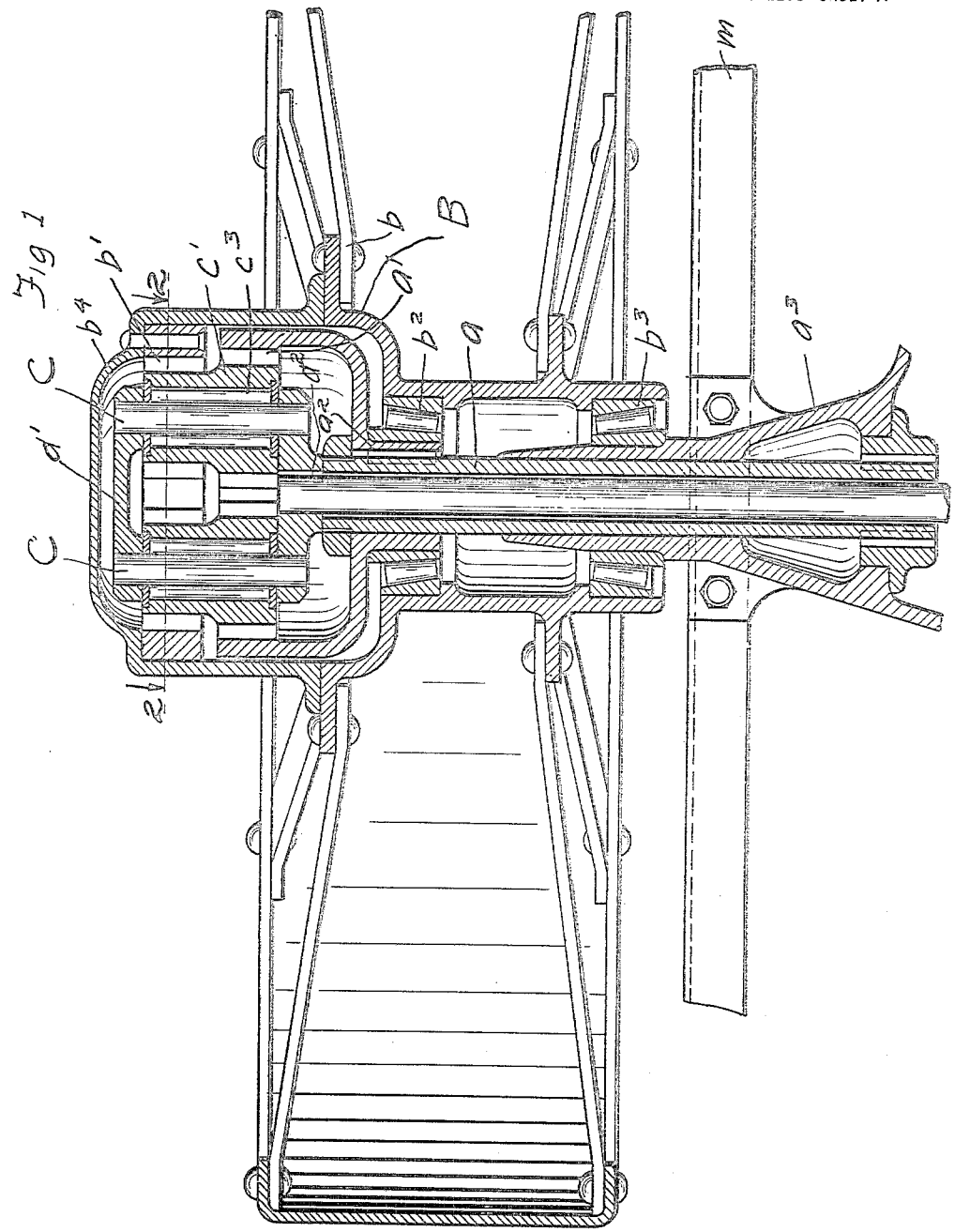

UNITED STATES PATENT OFFICE.

MAURICE WALTER, OF NEW YORK, N. Y., ASSIGNOR TO WALTER MOTOR TRUCK COMPANY, OF NEW YORK, N. Y., A CORPORATION OF NEW YORK.

DRIVE FOR SELF-PROPELLED VEHICLES.

1,377,864.   Specification of Letters Patent.   Patented May 10, 1921.

Application filed July 1, 1919. Serial No. 307,929.

*To all whom it may concern:*

Be it known that I, MAURICE WALTER, a citizen of the United States, residing in the borough of Manhattan of the city of New York, in the State of New York, have invented certain new and useful Improvements in Drives for Self-Propelled Vehicles, of which the following is a specification, reference being had to the accompanying drawings, forming a part hereof.

This invention is concerned with the final drive of a self-propelled vehicle, such as a tractor of either the wheel or track laying type, or a motor truck or car, although it will be evident as the description proceeds that the advantages will probably make the drive of greatest importance in a wheel type tractor, and accordingly the drawings illustrate the invention in such an embodiment. The primary object of the invention is to secure a great reduction of speed in the final drive thereby eliminating the usual series of compounding gears which require a massive and clumsy construction as regards the shafts, bearings and housings. In accordance with the invention it becomes possible to provide, for a given tractive effort, a smaller motor and a lighter clutch and transmission construction which not only reduces the cost substantially but insures a more efficient transmission of power and enables the driven element itself to be made of larger diameter than heretofore. Further advantages will be found in that the improved drive has its parts readily accessible, adequately lubricated under all conditions of use, completely incased so as to be protected from deposits of dust and other foreign matter and permits a greater ground clearance than heretofore.

Two practical embodiments of the invention in a wheel tractor are illustrated in the accompanying drawings, in which—

Figure 1 is a fragmentary view, partly in plan and partly in horizontal section, indicating one of the side frame members of the tractor and one of the drive wheels.

Fig. 2 is a fragmentary view in section taken through the hub cap of the wheel shown in Fig. 1 along the plane indicated by the line 2—2 of Fig. 1 and looking in the direction of the arrows.

Referring now to Figs. 1 and 2, it appears that the non-rotatable axle tube $a$ is mounted within the axle housing $a^3$ which is carried on the side frame member $m$ of the frame of the vehicle, either directly or through some suitable spring suspension, if desired. The drive wheel $b$ is mounted on the axle by means of suitable bearings $b^2$, $b^3$, illustrated as roller bearings. The open hub B of the wheel is shown as provided with a cylindrical hub cap $b^4$, which is of such form and size as to incase completely the driving elements which constitute the invention, this hub cap $b^4$ being secured detachably to the wheel hub B to permit ready accessibility to the driving elements for purpose of assembling and disassembling, and the packing of the housing with a suitable lubricant. This hub cap $b^4$ when in place on the hub B of course completely protects the driving elements against deposits of dust and other foreign matter. To the axle tube $a$ is keyed, as at $a^2$, an internal gear $a'$, the diameter of which determines the necessary diameter of the hub cap $b^4$. By reason of the great reduction obtained by the improved drive, it will appear that this diameter is small and the resulting structure is accordingly very compact. Within the outer end of the hub cap $b^4$ is secured an internal gear $b'$. Through the axle tube $a$ extends the live axle section $d^2$ which may derive its power through any suitable transmission elements. On the end of the axle section $b^2$ is fixed a drum or carrier $d'$ in which are journaled, as on roller bearings $c^3$, compound spur gears $c'$, $c^2$. These gears are mounted revolubly through the bearings $c^3$ on stub shafts C supported in the drum $d'$. One of the sets of teeth on each spur gear $c'$, $c^2$ is in mesh with the internal gear $a'$ and the other set of teeth on each of the gears is in mesh with the internal gear $b'$ in the hub cap $b^4$. The two sets of teeth on each of the compound spur gear $c'$ are of different pitch diameter, the set in mesh with the internal gear $a'$, in the illustrated embodiment, being of larger pitch diameter than the teeth engaging the internal gear $b'$, for reasons which will be described with the operation of both of the illustrated embodiments.

In the operation of the improved final drive it will be evident that the compound gears $c'$, $c^2$, roll, respectively, about the fixed gear $a'$, due to the rotation of the drums $d'$, on the drive shaft $d^2$. By reason of the difference in the pitch diameters of the respective sets of teeth on each of the compound gears $c'$, $c^2$; such movement imparts a rotative movement to the gear $b'$, this gear being carried by the drive wheel $b$. Were the sets of teeth on each of the compound spur gears $c'$, $c^2$ of the same pitch diameter, it is evident that upon rotation of the drum $d'$, no rotative movement would be imparted to the gear $b'$, and accordingly the drive wheel $b$, would not be rotated. By the least possible variance in the pitch diameters in the two sets of teeth on the compound spur gears $c'$, $c^2$; the maximum speed reduction and greatest torque is obtained between the drive shaft $d^2$ and drive wheel $b$. By varying the pitch diameters between the compound spur gears $c'$, $c^2$ any desired reduction may be obtained.

In known devices it is usual to obtain the desired reduction by means of compound gears interposed, in one or more sets, between the motor and the the wheels, it being common practice, particularly in the case of wheel tractors, to obtain a great reduction at the final drive by means of a bull gear of great diameter carried on the wheel and engaged by a pinion on the live axle section of relatively small diameter. All of the known constructions require the use of heavy shafts, bearings and housings, making the entire machine of great mass. Further, in such constructions it is impossible to house all of the gears completely and protect them against dust and other foreign substances and provide them at all times with adequate lubrication. The expense of such massive constructions is also great and the parts very difficult of access. By the construction described it is evident that none of the usual bulky transmission between the motor and the live axle section is employed and that the improved final drive gives such a great reduction that for a given driving effort the motor may be smaller than heretofore and all of the intermediate transmission devices may be relatively light. The efficiency of the machine is accordingly increased to a great extent and the expense very much reduced. The reduction gears being mounted on the wheel and, conveniently, within the hub cap thereof, may be packed with a lubricant, readily assembled or removed when the housing is detached, and are protected completely against dust and other foreign substances.

The type of drive is more compact by reason of the use of the internal gears instead of the spur gears. Further, the great number of teeth found in the large gears thus employed gives a great load capacity for a given design inasmuch as the net stress on each tooth is materially less than is the case where a spur gear of smaller diameter is employed.

The drawings show a suitable embodiment of the invention for application to a wheel tractor. It is to be understood, however, that such final drive may be incorporated in a track laying tractor or in a motor truck or motor car. It is also evident that the improved drive as illustrated has for its purpose to effect a great reduction between the motor and the drive wheel. Further the invention is not to be limited to the number of planet gears employed, it being evident that, generally speaking, the greater the number of planet gears, the less the tooth strain. The purely mechanical structural features might also be changed in so far as concerns the particular relation between the various gears, wheel, hub cap and drum and the type of drum or carrier itself might be modified to meet varying conditions of use.

I claim as my invention:

1. In a wheel tractor, in combination with a tubular dead axle, bearings for the wheel on the dead axle and a drive shaft extending through the dead axle, a gear fixed on the wheel beyond the dead axle, a non-rotatable gear of different pitch diameter from the first named gear fast with relation to but beyond the dead axle, a carrier on the drive shaft beyond the dead axle and compound spur gears journaled in the carrier and having sets of teeth of different pitch diameter meshed with the two first named gears respectively.

2. In a wheel tractor, in combination with a tubular dead axle, bearings for the wheel on the dead axle and a drive shaft extending through the dead axle and extending through the hub of the wheel, a hub cap detachably secured to the wheel, a non-rotatable gear mounted within the hub and beyond the dead axle, a second gear mounted within the hub and rotatable therewith and beyond the dead axle, a drum fixed adjacent to the end of the drive shaft beyond the dead axle and compound gears journaled in the drum and beyond the dead axle and having sets of teeth of different pitch diameter meshed with the two first named gears respectively.

3. In a self-propelled vehicle, the combination of a tubular dead axle section, a drive wheel bearings for the wheel on the dead axle, a drive shaft extending through the axle section, an internal gear fixed on the axle section and beyond the dead axle, an internal gear carried with the wheel and beyond the dead axle, both of said gears being concentric with the drive shaft, a drum fixed adjacent to the end of the drive shaft and beyond the dead axle and compound gears journaled in the drum and beyond the dead axle and having sets of teeth of different pitch diameter meshed with the two first named gears respectively.

4. In a self-propelled vehicle, in combination with the frame and main drive shaft, an axle housing supported on the frame, a non-rotatable tubular axle section supported in the axle housing, a differential gear journaled in the axle housing and operatively connected with the main drive shaft, a live axle section extending through the tubular dead axle section, a drive wheel mounted on the tubular dead axle section, an internal gear fixed on but beyond the dead axle section, an internal gear carried with the wheel and beyond the dead axle, both of said gears being concentric with the drive shaft, a drum fixed adjacent to the end of the drive shaft and beyond the wheel bearing, and compound gears journaled in the drum and beyond the dead axle and having sets of teeth of different pitch diameter meshed with said internal gears respectively.

5. In a self-propelled vehicle, in combination with a tubular dead axle, bearings for the wheel on the dead axle and a drive shaft extending through the dead axle, a final drive comprising a driven element, a drive shaft, a tubular dead axle, a gear fixed on the driven element and beyond the dead axle, a non-rotatable gear of different pitch diameter from the first named gear and beyond the dead axle, a carrier on the drive shaft beyond the wheel bearings and compound spur gears journaled in the carrier and beyond the dead axle and having sets of teeth of different pitch diameter meshed with the two first named gears respectively, the set of larger pitch diameter being meshed with the non-rotatable gear.

This specification signed this 26th day of June, A. D. 1919.

MAURICE WALTER.